United States Patent
Morita et al.

(10) Patent No.: US 12,249,162 B2
(45) Date of Patent: Mar. 11, 2025

(54) IMAGE DISPLAY SYSTEM

(71) Applicant: HONDA MOTOR CO., LTD., Tokyo (JP)

(72) Inventors: Jumpei Morita, Tokyo (JP); Tatsuro Fujiwara, Tokyo (JP); Yasushi Shoda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 506 days.

(21) Appl. No.: 17/679,546

(22) Filed: Feb. 24, 2022

(65) Prior Publication Data

US 2022/0309803 A1   Sep. 29, 2022

(30) Foreign Application Priority Data

Mar. 24, 2021   (JP) ................................. 2021-049649

(51) Int. Cl.
*G06V 20/58* (2022.01)
*B60W 30/06* (2006.01)

(52) U.S. Cl.
CPC ........... *G06V 20/586* (2022.01); *B60W 30/06* (2013.01)

(58) Field of Classification Search
CPC ................ G06V 20/586; B60W 30/06; B60W 2050/146; B60W 50/14; B60W 40/02; B60W 2520/10; B60R 1/00; B60R 2300/301
See application file for complete search history.

(56) References Cited

U.S. PATENT DOCUMENTS

| | | |
|---|---|---|
| 2012/0068840 A1 | 3/2012 | Ozaki et al. |
| 2016/0212384 A1* | 7/2016 | Sawada ................... G06T 15/04 |
| 2018/0272948 A1* | 9/2018 | Kumon ................. G06T 19/006 |
| 2020/0226817 A1 | 7/2020 | Pankey et al. |
| 2022/0185183 A1 | 6/2022 | Kida et al. |

FOREIGN PATENT DOCUMENTS

| | | | |
|---|---|---|---|
| JP | 2010274814 A | | 12/2010 |
| JP | WO2013168230 A1 | * | 12/2015 |
| JP | 2020537427 A | | 12/2020 |
| JP | 2022095303 A | | 6/2022 |
| WO | 2011001642 A1 | | 1/2011 |
| WO | 2020148957 A1 | | 7/2020 |

OTHER PUBLICATIONS

Notice of Reasons for Refusal for Japanese Patent Application JP2021-049649 dated Sep. 13, 2022; 7 pp.

* cited by examiner

*Primary Examiner* — Carol W Chan
(74) *Attorney, Agent, or Firm* — Armstrong Teasdale LLP

(57) ABSTRACT

An image display system includes: a display device configured to display external environment information; an input device configured to receive an input operation by a user; and a control device configured to control a display of the external environment information on the display device according to the input operation by the user. The control device is configured to generate an outside virtual viewpoint image and an inside virtual viewpoint image and cause the display device to display the outside virtual viewpoint image and the inside virtual viewpoint image. When the input device receives a prescribed enlarging operation in a state where the display device displays the outside virtual viewpoint image, the control device switches an image on the display device from the outside virtual viewpoint image to the inside virtual viewpoint image.

12 Claims, 7 Drawing Sheets

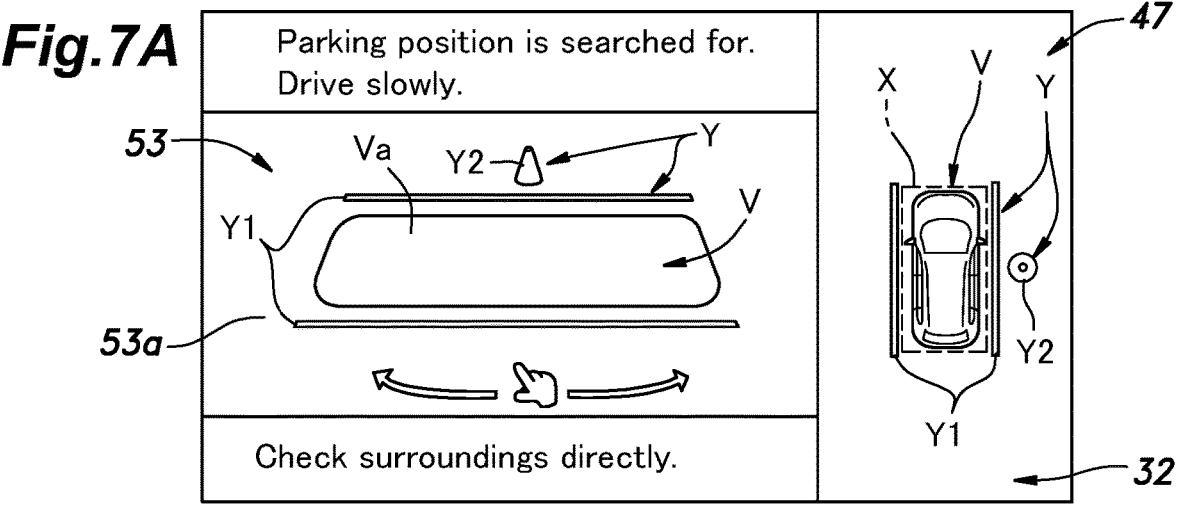
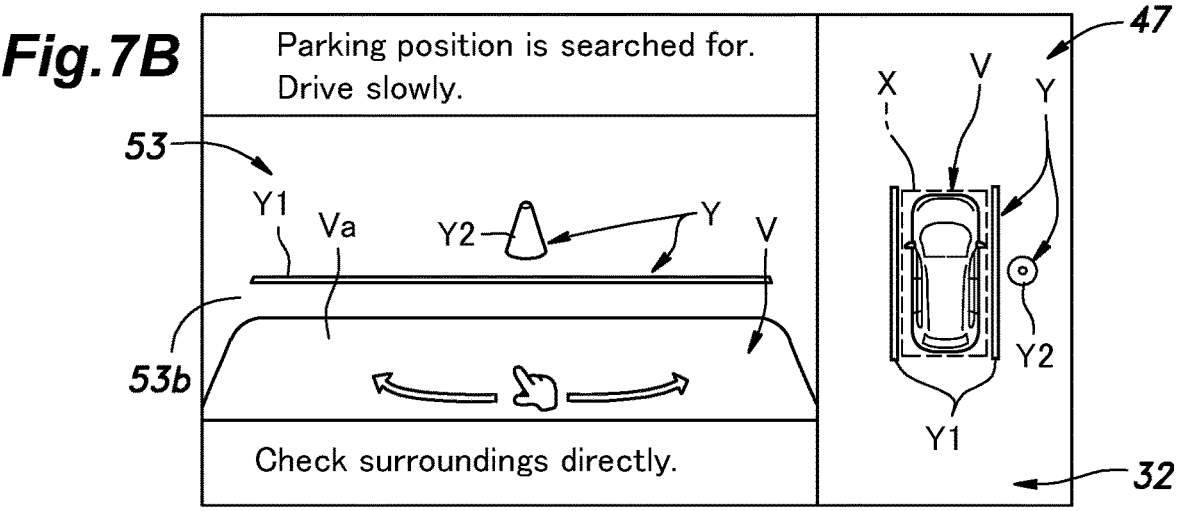
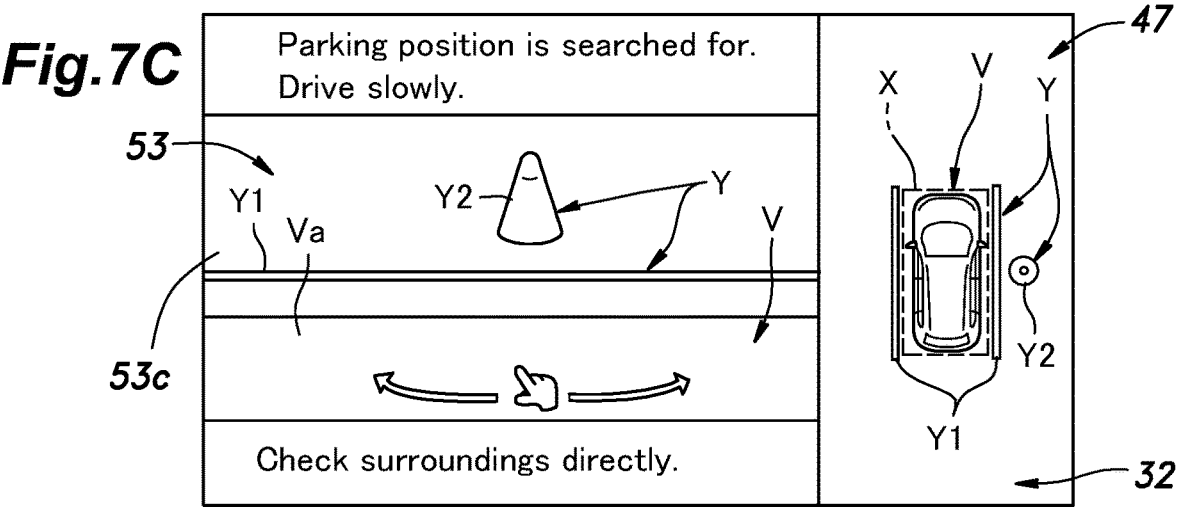

IMAGE DISPLAY SYSTEM

TECHNICAL FIELD

The present invention relates to an image display system.

BACKGROUND ART

Conventionally, an image display system can display an image (hereinafter referred to as "virtual viewpoint image") in which a mobile body such as a vehicle and an object around the mobile body are viewed from a virtual viewpoint.

For example, WO2020/148957A1 discloses a vehicle control device including a processor that generates a three-dimensional image from a first viewpoint based on an image around an own vehicle captured by each of a plurality of cameras. Upon switching from the first viewpoint to a second viewpoint, the processor generates a rotational animation of the own vehicle and causes a display to display an image formed by compositing the rotational animation of the own vehicle and a black image.

In the above conventional technique, all of the virtual viewpoints are set outside the mobile body (namely, the own vehicle). Accordingly, it is impossible to switch between the virtual viewpoint image from the virtual viewpoint outside the mobile body and the virtual viewpoint image from the virtual viewpoint inside the mobile body. In other words, it is impossible to switch the position of the virtual viewpoint between an inside of the mobile body and an outside thereof.

SUMMARY OF THE INVENTION

In view of the above background, an object of the present invention is to switch between a virtual viewpoint image from a virtual viewpoint outside a mobile body and a virtual viewpoint image from a virtual viewpoint inside the mobile body by an easy operation. In other words, an object of the present invention is to switch the position of the virtual viewpoint between an inside of the mobile body and an outside thereof by an easy operation.

To achieve such an object, one aspect of the present invention provides an image display system (1), comprising: an external environment information acquiring device (19) configured to acquire external environment information around a mobile body (V); a display device (32) configured to display the external environment information acquired by the external environment information acquiring device; an input device (32) configured to receive an input operation by a user; and a control device (15) configured to control a display of the external environment information on the display device according to the input operation by the user, wherein the control device is configured to generate an outside virtual viewpoint image (51) and an inside virtual viewpoint image (52) and cause the display device to display the outside virtual viewpoint image and the inside virtual viewpoint image, the outside virtual viewpoint image being an image in which the mobile body and an object (Y) around the mobile body are viewed from a virtual viewpoint (A) outside the mobile body, the inside virtual viewpoint image being an image in which the mobile body and the object are viewed from a virtual viewpoint (C) inside the mobile body, and when the input device receives a prescribed enlarging operation in a state where the display device displays the outside virtual viewpoint image, the control device switches an image on the display device from the outside virtual viewpoint image to the inside virtual viewpoint image.

According to this aspect, the user can switch the image on the display device from the outside virtual viewpoint image to the inside virtual viewpoint image by an easy operation (namely, the enlarging operation). Accordingly, it is possible to improve the convenience of the image display system.

To achieve such an object, another aspect of the present invention provides an image display system (1), comprising: an external environment information acquiring device (19) configured to acquire external environment information around a mobile body (V); a display device (32) configured to display the external environment information acquired by the external environment information acquiring device; an input device (32) configured to receive an input operation by a user; and a control device (15) configured to control a display of the external environment information on the display device according to the input operation by the user, wherein the control device is configured to generate an outside virtual viewpoint image (51) and an inside virtual viewpoint image (52) and cause the display device to display the outside virtual viewpoint image and the inside virtual viewpoint image, the outside virtual viewpoint image being an image in which the mobile body and an object (Y) around the mobile body are viewed from a virtual viewpoint (A) outside the mobile body, the inside virtual viewpoint image being an image in which the mobile body and the object are viewed from a virtual viewpoint (C) inside the mobile body, and when the input device receives a prescribed reducing operation in a state where the display device displays the inside virtual viewpoint image, the control device switches an image on the display device from the inside virtual viewpoint image to the outside virtual viewpoint image.

According to this aspect, the user can switch the image on the display device from the inside virtual viewpoint image to the outside virtual viewpoint image by an easy operation (namely, the reducing operation). Accordingly, it is possible to improve the convenience of the image display system.

In the above aspect, preferably, when switching the image on the display device from the outside virtual viewpoint image to the inside virtual viewpoint image, the control device causes the display device to display an animation (53) in which the mobile body is gradually enlarged.

According to this aspect, by displaying the animation in which the mobile body is gradually enlarged between the outside virtual viewpoint image and the inside virtual viewpoint image, it is possible to clearly inform the user that the image on the display device switches from the outside virtual viewpoint image to the inside virtual viewpoint image.

In the above aspect, preferably, when switching the image on the display device from the inside virtual viewpoint image to the outside virtual viewpoint image, the control device causes the display device to display an animation in which the mobile body is gradually reduced.

According to this aspect, by displaying the animation in which the mobile body is gradually reduced between the inside virtual viewpoint image and the outside virtual viewpoint image, it is possible to clearly inform the user that the image on the display device switches from the inside virtual viewpoint image to the outside virtual viewpoint image.

In the above aspect, preferably, the control device is configured to switch the image on the display device between the outside virtual viewpoint image and the inside virtual viewpoint image based on a center point set inside the mobile body.

According to this aspect, the user can easily understand the position of the virtual viewpoint after the switch between the outside virtual viewpoint image and the inside virtual viewpoint image.

In the above aspect, preferably, the control device is configured to switch the image on the display device between the outside virtual viewpoint image and the inside virtual viewpoint image such that a first direction matches a second direction in a plan view, the first direction being a direction in which the mobile body and the object are viewed from the virtual viewpoint outside the mobile body, the second direction being a direction in which the mobile body and the object are viewed from the virtual viewpoint inside the mobile body.

According to this aspect, the user can easily understand the direction of the virtual viewpoint after the switch between the outside virtual viewpoint image and the inside virtual viewpoint image. Further, when the image on the display device switches from the outside virtual viewpoint image to the inside virtual viewpoint image, a space hidden behind the mobile body in the outside virtual viewpoint image can be displayed in the inside virtual viewpoint image. Accordingly, the user can easily check the object in the above space, and thus improve the visibility of the surroundings of the mobile body.

To achieve such an object, still another aspect of the present invention provides an image display system (1), comprising: an external environment information acquiring device (19) configured to acquire external environment information around a mobile body (V); a display device (32) configured to display the external environment information acquired by the external environment information acquiring device; an input device (32) configured to receive an input operation by a user; and a control device (15) configured to control a display of the external environment information on the display device according to the input operation by the user, wherein the control device is configured to generate a virtual viewpoint image (51, 52) and cause the display device to display the virtual viewpoint image, the virtual viewpoint image being an image in which the mobile body and an object (Y) around the mobile body are viewed from a virtual viewpoint (A, C), and when the input device receives one of a prescribed enlarging operation and a prescribed reducing operation in a state where the display device displays the virtual viewpoint image, the control device switches a position of the virtual viewpoint between an inside of the mobile body and an outside thereof.

According to this aspect, the user can switch the position of the virtual viewpoint between the inside of the mobile body and the outside thereof by an easy operation (namely, the enlarging operation or the reducing operation). Accordingly, it is possible to improve the convenience of the image display system.

In the above aspect, preferably, when switching the position of the virtual viewpoint between the inside of the mobile body and the outside thereof, the control device causes the display device to display an animation in which the mobile body is gradually enlarged or reduced.

According to this aspect, by displaying the animation in which the mobile body is gradually enlarged or reduced, it is possible to clearly inform the user that the position of the virtual viewpoint is switched.

In the above aspect, preferably, the control device is configured to switch the position of the virtual viewpoint between the inside of the mobile body and the outside thereof based on a center point set inside the mobile body.

According to this aspect, the user can easily understand the position of the virtual viewpoint after the switch in the position of the virtual viewpoint.

In the above aspect, preferably, the control device is configured to switch the position of the virtual viewpoint between the inside of the mobile body and the outside thereof such that a first direction matches a second direction in a plan view, the first direction being a direction in which the mobile body and the object are viewed from the virtual viewpoint outside the mobile body, the second direction being a direction in which the mobile body and the object are viewed from the virtual viewpoint inside the mobile body.

According to this aspect, the user can easily understand the direction of the virtual viewpoint after the switch in the position of the virtual viewpoint. Further, when the position of the virtual viewpoint switches from the outside of the mobile body to the inside thereof, a space hidden behind the mobile body in the virtual viewpoint image before the switch can be displayed in the virtual viewpoint image after the switch. Accordingly, the user can easily check the object in the above space, and thus improve the visibility of the surroundings of the mobile body.

Thus, according to the above aspects, it is possible to switch between a virtual viewpoint image from a virtual viewpoint outside a mobile body and a virtual viewpoint image from a virtual viewpoint inside the mobile body by an easy operation. In other words, it is possible to switch the position of the virtual viewpoint between an inside of the mobile body and an outside thereof by an easy operation.

BRIEF DESCRIPTION OF THE DRAWING(S)

FIG. 7A is a diagram showing the screen of the touch panel on which an animation is displayed in the parking assist system according to the embodiment;

FIG. 7B is a diagram showing the screen of the touch panel on which an animation is displayed in the parking assist system according to the embodiment; and FIG. 7C is a diagram showing the screen of the touch panel on which an animation is displayed in the parking assist system according to the embodiment.

DETAILED DESCRIPTION OF THE INVENTION

In the following, an embodiment of the present invention will be described in detail with reference to the drawings.

A parking assist system 1 (an example of an image display system) is mounted on a vehicle V (an example of a mobile body: an automobile in the present embodiment) provided with a vehicle control system 2 configured to make the vehicle V travel autonomously.

Figure 1:
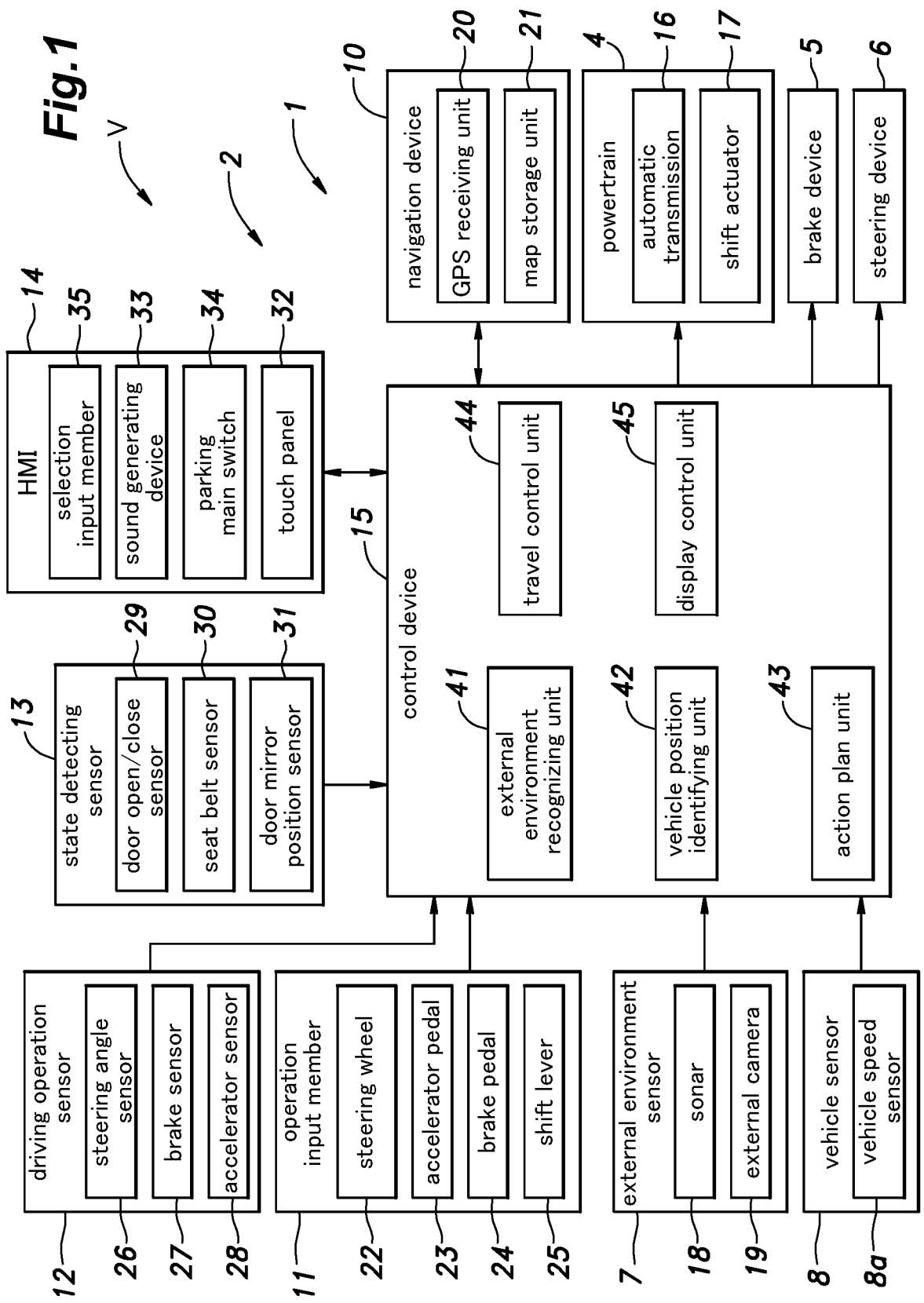
FIG. 1 is a functional block diagram of a vehicle provided with a parking assist system according to an embodiment of the present invention.

As shown in FIG. 1, the vehicle control system 2 includes a powertrain 4, a brake device 5, a steering device 6, an external environment sensor 7, a vehicle sensor 8, a navigation device 10, an operation input member 11, a driving operation sensor 12, a state detecting sensor 13, a human machine interface (HMI) 14, and a control device 15. The above components of the vehicle control system 2 are connected to each other so that signals can be transmitted therebetween via communication means such as a Controller Area Network (CAN).

The powertrain 4 is a device configured to apply a driving force to the vehicle V. The powertrain 4 includes a power source and a transmission, for example. The power source includes at least one of an internal combustion engine, such as a gasoline engine and a diesel engine, and an electric motor. In the present embodiment, the powertrain 4 includes an automatic transmission 16 (an example of a power transmission device) and a shift actuator 17 for changing a shift range (shift position) of the automatic transmission 16 (a shift position of the vehicle V). The brake device 5 is a device configured to apply a brake force to the vehicle V. For example, the brake device 5 includes a brake caliper configured to press a brake pad against a brake rotor and an electric cylinder configured to supply a brake pressure (an oil pressure) to the brake caliper. The brake device 5 may include an electric parking brake device configured to restrict rotations of wheels via wire cables. The steering device 6 is a device for changing a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 serves as an external environment information acquisition device for detecting electromagnetic waves, sound waves, and the like from the surroundings of the vehicle V to detect an object outside the vehicle V and to acquire surrounding information of the vehicle V. The external environment sensor 7 includes sonars 18 and external cameras 19. The external environment sensor 7 may further include a millimeter wave radar and/or a lidar. The external environment sensor 7 outputs a detection result to the control device 15.

Each sonar 18 consists of a so-called ultrasonic sensor. Each sonar 18 emits ultrasonic waves to the surroundings of the vehicle V and captures the ultrasonic waves reflected by an object, thereby detecting the position (distance and direction) of the object. Plural sonars 18 are provided at each of a rear portion and a front portion of the vehicle V. In the present embodiment, a pair of sonars 18 are provided on a rear bumper so as to be spaced laterally from each other, a pair of sonars 18 are provided on a front bumper so as to be spaced laterally from each other, and four sonars 18 are provided at front and rear ends of both lateral surfaces of the vehicle V, respectively. Namely, the vehicle V is provided with eight sonars 18 in total. The sonars 18 provided on the rear bumper mainly detect the positions of the objects behind the vehicle V. The sonars 18 provided on the front bumper mainly detect the positions of the objects in front of the vehicle V. The sonars 18 provided at the front ends of both lateral surfaces of the vehicle V detect the positions of the objects on left and right outsides of the front end of the vehicle V, respectively. The sonars 18 provided at the rear ends of both lateral surfaces of the vehicle V detect the positions of the objects on left and right outsides of the rear end of the vehicle V, respectively.

The external cameras 19 are devices configured to capture images around the vehicle V. Each external camera 19 consists of a digital camera using a solid imaging element such as a CCD or a CMOS, for example. The external cameras 19 include a front camera for capturing an image in front of the vehicle V and a rear camera for capturing an image to the rear of the vehicle V. The external cameras 19 may include a pair of left and right side cameras that are provided in the vicinity of the door mirrors of the vehicle V to capture images on left and right sides of the vehicle V.

The vehicle sensor 8 includes a vehicle speed sensor 8a configured to detect the vehicle speed of the vehicle V, an acceleration sensor configured to detect the acceleration of the vehicle V, a yaw rate sensor configured to detect the angular velocity around a vertical axis of the vehicle V, and a direction sensor configured to detect the direction of the vehicle V. For example, the vehicle speed sensor 8a consists of plural wheel speed sensors. Each wheel speed sensor is configured to detect the wheel speed (the rotational speed of each wheel). For example, the yaw rate sensor consists of a gyro sensor.

The navigation device 10 is a device configured to obtain a current position of the vehicle V and provides route guidance to a destination and the like. The navigation device 10 includes a GPS receiving unit 20 and a map storage unit 21. The GPS receiving unit 20 identifies a position (latitude and longitude) of the vehicle V based on a signal received from an artificial satellite (positioning satellite). The map storage unit 21 consists of a known storage device such as a flash memory or a hard disk, and stores map information.

The operation input member 11 is provided in a vehicle cabin to receive an input operation performed by the occupant (user) to control the vehicle V. The operation input member 11 includes a steering wheel 22, an accelerator pedal 23, a brake pedal 24 (brake input member), and a shift lever 25 (shift member). The shift lever 25 is configured to receive an operation for switching the shift position of the vehicle V.

The driving operation sensor 12 detects an operation amount of the operation input member 11. The driving operation sensor 12 includes a steering angle sensor 26 configured to detect a turning angle of the steering wheel 22, a brake sensor 27 configured to detect a pressing amount of the brake pedal 24, and an accelerator sensor 28 configured to detect a pressing amount of the accelerator pedal 23. The driving operation sensor 12 outputs a detected operation amount to the control device 15.

The state detecting sensor 13 is a sensor configured to detect a change in a state of the vehicle V according to an operation by the occupant. The operation by the occupant detected by the state detecting sensor 13 includes an operation indicating an alighting intention (intention to alight from the vehicle V) of the occupant and an operation indicating absence of an intention of the occupant to check the surroundings of the vehicle V during an autonomous parking operation or an autonomous unparking operation. The state detecting sensor 13 includes, as sensors for detecting the operation indicating the alighting intention, a door open/close sensor 29 configured to detect opening and/or closing of a door of the vehicle V and a seat belt sensor 30 configured to detect a fastening state of a seat belt. The state detecting sensor 13 includes, as a sensor to detect the operation corresponding to the abdicating intention, a door mirror position sensor 31 configured to detect a position of a door mirror. The state detecting sensor 13 outputs a signal indicating a detected change in the state of the vehicle V to the control device 15.

The HMI 14 is an input/output device for receiving an input operation by the occupant and notifying the occupant of various kinds of information by display and/or voice. The HMI 14 includes, for example, a touch panel 32 that includes a display screen such as a liquid crystal display or an organic EL display and is configured to receive the input operation by the occupant, a sound generating device 33 such as a buzzer or a speaker, a parking main switch 34, and a selection input member 35. The parking main switch 34 receives the input operation by the occupant to execute selected one of an automatic parking process (autonomous parking operation) and an automatic unparking process (autonomous unparking operation). The parking main switch 34 is a so-called momentary switch that is turned on only while a pressing operation (pushing operation) is performed by the occupant. The selection input member 35 receives a selection operation by the occupant related to selection of the automatic parking process and the automatic unparking process. The selection input member 35 may consist of a rotary select switch, which preferably requires pressing as the selection operation.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware. Further, the functions of the control device 15 may be at least partially executed by hardware such as an LSI, an ASIC, and an FPGA, or may be executed by a combination of software and hardware.

Further, the control device 15 executes an arithmetic process according to a program and thereby performs a conversion process of an image (video) captured by the external cameras 19 so as to generate a look-down image 47 corresponding to a plan view of the vehicle V and its surrounding area and a bird's-eye image 48 corresponding to a three-dimensional image of the vehicle V and a part of its surrounding area positioned in the travel direction as viewed from above. The control device 15 may generate the look-down image 47 by combining the images of the front camera, the rear camera, and the left and right side cameras, and may generate the bird's-eye image 48 by combining the image captured by the front camera or the rear camera facing the travel direction and the images captured by the left and right side cameras.

The parking assist system 1 is a system for executing the so-called automatic parking process and the so-called automatic unparking process, in which a vehicle V is moved autonomously to a prescribed target position (a target parking position or a target unparking position) selected by the occupant so as to park or unpark the vehicle V.

The parking assist system 1 includes the external cameras 19 (an example of an external environment information acquiring device), the touch panel 32 (an example of a display device and an input device), and the control device 15. Each external camera 19 captures a surrounding image of the vehicle V (an example of external environment information around the vehicle V). The touch panel 32 displays the surrounding image captured by each external camera 19. The control device 15 controls the display of the surrounding image on the touch panel 32 according to an input operation by the occupant.

The control device 15 controls the powertrain 4, the brake device 5, and the steering device 6 so as to execute an autonomous parking operation to move the vehicle V autonomously to a target parking position and park the vehicle V at the target parking position and an autonomous unparking operation to move the vehicle V autonomously to a target unparking position and unpark the vehicle V at the target unparking position. In order to execute such operations, the control device 15 includes an external environment recognizing unit 41, a vehicle position identifying unit 42, an action plan unit 43, a travel control unit 44, and a display control unit 45.

The external environment recognizing unit 41 recognizes an obstacle (for example, a parked vehicle or a wall) that is present around the vehicle V based on the detection result of the external environment sensor 7, and thereby obtains information about the obstacle. Further, the external environment recognizing unit 41 analyzes the images captured by the external cameras 19 based on a known image analysis method such as pattern matching, and thereby determines whether a vehicle stopper (wheel stopper) or an obstacle is present, and obtains the size of the vehicle stopper or the obstacle in a case where the vehicle stopper or the obstacle is present. Further, the external environment recognizing unit 41 may compute a distance to the obstacle based on signals from the sonars 18 to obtain the position of the obstacle.

Also, by the analysis of the detection result of the external environment sensor 7 (more specifically, by the analysis of the images captured by the external cameras 19 based on a known image analysis method such as pattern matching), the external environment recognizing unit 41 can acquire, for example, a lane on a road delimited by road signs and a parking space delimited by white lines and the like provided on a surface of a road, a parking lot, and the like.

The vehicle position identifying unit 42 identifies the position of the vehicle V (the own vehicle) based on a signal from the GPS receiving unit 20 of the navigation device 10. Further, the vehicle position identifying unit 42 may obtain the vehicle speed and the yaw rate from the vehicle sensor 8, in addition to the signal from the GPS receiving unit 20, and identify the position and posture of the vehicle V by the so-called inertial navigation.

The travel control unit 44 controls the powertrain 4, the brake device 5, and the steering device 6 based on a travel control instruction from the action plan unit 43 to make the vehicle V travel.

The display control unit 45 generates the surrounding image of the vehicle V, and causes the touch panel 32 to display the generated surrounding image. The display control unit 45 switches the surrounding image displayed on the touch panel 32 based on the input operation by the occupant and an instruction from the action plan unit 43.

The action plan unit 43 executes the automatic parking process (autonomous parking operation) or the automatic unparking process (autonomous unparking operation) when the vehicle V is in a prescribed state and the HMI 14 or the parking main switch 34 receives a prescribed input by the user, which corresponds to a request for the automatic parking process or the automatic unparking process. More specifically, the action plan unit 43 executes the automatic parking process in a case where a prescribed input corresponding to the automatic parking process is performed when the vehicle V is stopped or the vehicle V is traveling at a low speed equal to or less than a prescribed vehicle speed (a vehicle speed at which a parking position candidate can be searched for). The action plan unit 43 executes the automatic unparking process (parallel unparking process) in a case where a prescribed input corresponding to the automatic unparking process is performed when the vehicle V is stopped. The selection of the process to be executed (the automatic parking process or the automatic unparking process) may be made by the action plan unit 43 based on the state of the vehicle V. Alternatively, the above selection may be made by the occupant via the touch panel 32 or the selection input member 35. When executing the automatic parking process, the action plan unit 43 first makes the touch panel 32 display a parking search screen for setting the target parking position. After the target parking position is set, the action plan unit 43 makes the touch panel 32 display a parking screen. When executing the automatic unparking process, the action plan unit 43 first makes the touch panel 32 display an unparking search screen for setting the target unparking position. After the target unparking position is set, the action plan unit 43 makes the touch panel 32 display an unparking screen.

Figure 2:
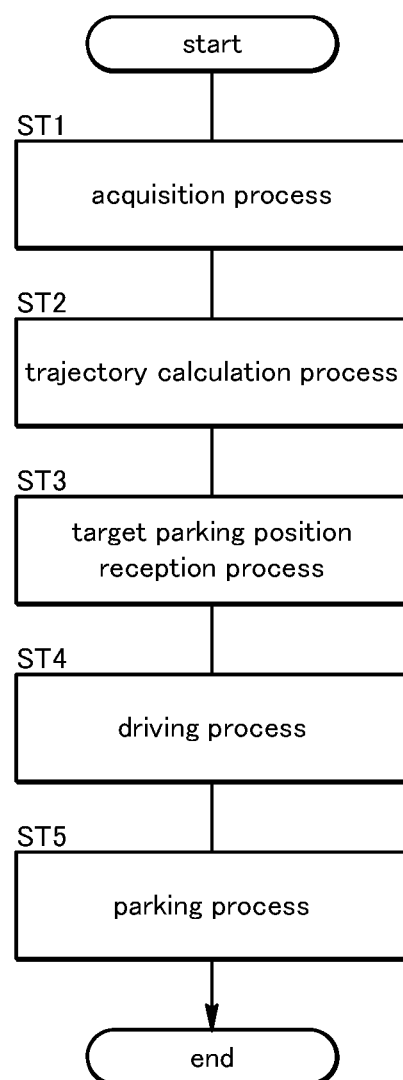
FIG. 2 is a flowchart of an automatic parking process in the parking assist system according to the embodiment.

In the following, the automatic parking process will be described with reference to FIG. 2. The action plan unit 43 first executes an acquisition process (step ST1) to acquire one or more parking spaces, if any. More specifically, in a case where the vehicle V is stopped, the action plan unit 43 first makes the touch panel 32 of the HMI 14 display a notification that instructs the occupant to move the vehicle V straight. While the occupant sitting in the driver's seat (hereinafter referred to as "driver") is moving the vehicle V straight, the external environment recognizing unit 41 acquires, based on a signal from the external environment sensor 7, a position and size of each detected obstacle and positions of the white lines provided on the road surface. The external environment recognizing unit 41 extracts, based on the acquired position and size of the obstacle and the acquired positions of the white lines, one or more undelimited parking spaces and one or more delimited parking spaces, if any (hereinafter, the undelimited parking spaces and the delimited parking spaces will be collectively referred to as "parking spaces"). Each undelimited parking space is a space that is not delimited by the white lines or the like, has a size sufficient to park the vehicle V, and is available (namely, there is no obstacle therein). Each delimited parking space is a space that is delimited by the white lines or the like, has a size sufficient to park the vehicle V, and is available (namely, another vehicle (vehicle other than the own vehicle) is not parked).

Next, the action plan unit 43 executes a trajectory calculation process (step ST2) to calculate a trajectory of the vehicle V from a current position of the vehicle V to each extracted parking space. In a case where the trajectory of the vehicle V can be calculated for a certain parking space, the action plan unit 43 sets the parking space as a parking position candidate where the vehicle V can be parked, and make the touch panel 32 display the parking position candidate on the screen (the parking search screen). In a case where the trajectory of the vehicle V cannot be calculated due to the presence of the obstacle, the action plan unit 43 does not set the parking space as a parking position candidate and does not make the touch panel 32 display the parking space on the screen. When the action plan unit 43 sets multiple parking position candidates (namely, multiple parking places for which the trajectory of the vehicle V can be calculated), the action plan unit 43 makes the touch panel 32 display these parking position candidates.

Figure 3A:
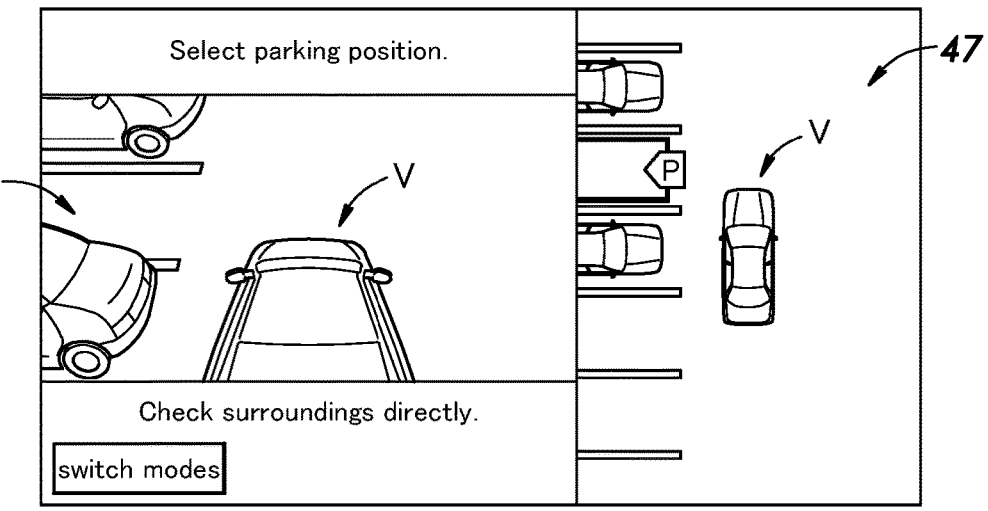
FIG. 3A is a diagram showing a screen display of a touch panel during a target parking position reception process in the parking assist system according to the embodiment.

Next, the action plan unit 43 executes a target parking position reception process (step ST3) to receive a selection operation performed by the occupant to select the target parking position, which is a parking position where the occupant wants to park the vehicle V, and is selected from the one or more parking position candidates displayed on the touch panel 32. More specifically, the action plan unit 43 makes the touch panel 32 display the look-down image 47 and the bird's-eye image 48 in the travel direction on the parking search screen shown in FIG. 3A. When the action plan unit 43 acquires at least one parking position candidate, the action plan unit 43 makes the touch panel 32 display a frame that indicates the parking position candidate and an icon that corresponds to the frame in at least one of the look-down image 47 and the bird's-eye image 48 (in the look-down image 47 in FIG. 3A) in an overlapping manner. The icon consists of a symbol indicating the parking position candidate (see "P" in FIG. 3A). Also, the action plan unit 43 makes the touch panel 32 display the parking search screen including a notification that instructs the driver to stop the vehicle V and select the target parking position, so that the touch panel 32 receives the selection operation of the target parking position. The selection operation of the target parking position may be performed via the touch panel 32, or may be performed via the selection input member 35.

Figure 3B:
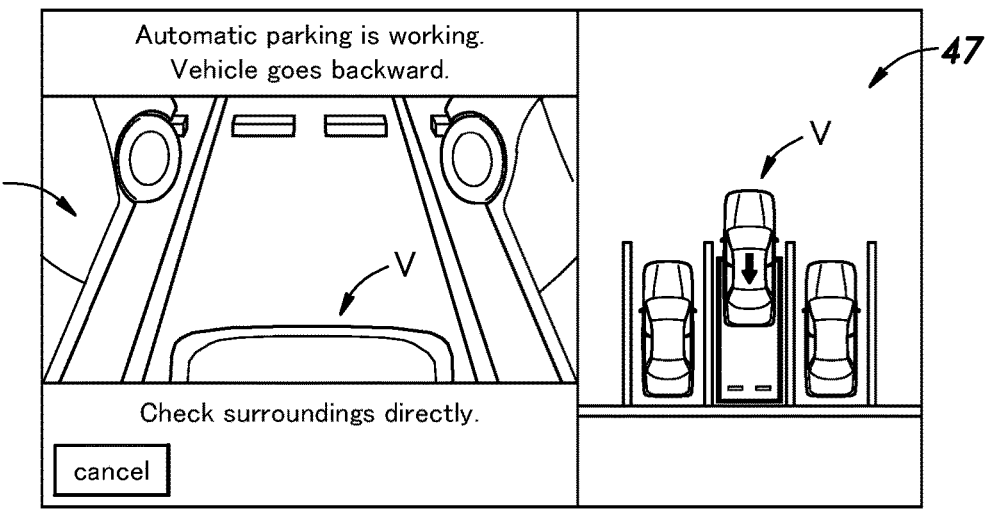
FIG. 3B is a diagram showing the screen display of the touch panel during a driving process in the parking assist system according to the embodiment.

After the vehicle V is stopped and the target parking position is selected by the driver, the action plan unit 43 makes the touch panel 32 switch the screen from the parking search screen to the parking screen. As shown in FIG. 3B, the parking screen is a screen in which an image in the travel direction of the vehicle V (hereinafter referred to as "travel direction image 49") is displayed on the left half of the touch panel 32 and the look-down image 47 including the vehicle V and its surrounding area is displayed on the right half thereof. At this time, the action plan unit 43 may make the touch panel 32 display a thick frame that indicates the target parking position selected from the parking position candidates and an icon that corresponds to the thick frame such that the thick frame and the icon overlap with the look-down image 47. This icon consists of a symbol indicating the target parking position, and is shown in a color different from the symbol indicating the parking position candidate.

After the target parking position is selected and the screen of the touch panel 32 is switched to the parking screen, the action plan unit 43 executes a driving process (step ST4) to make the vehicle V travel along the calculated trajectory. At this time, the action plan unit 43 controls the vehicle V based on the position of the vehicle V acquired by the GPS receiving unit 20 and the signals from the external cameras 19, the vehicle sensor 8, and the like so that the vehicle V travels along the calculated trajectory. At this time, the action plan unit 43 controls the powertrain 4, the brake device 5, and the steering device 6 so as to execute a switching operation for switching the travel direction of the vehicle V (a reversing operation for reversing the travel direction of the vehicle V). The switching operation may be executed repeatedly, or may be executed only once.

During the driving process, the action plan unit 43 may acquire the travel direction image 49 from the external cameras 19 and make the touch panel 32 display the acquired travel direction image 49 on the left half thereof. For example, as shown in FIG. 3B, when the vehicle V is moving backward, the action plan unit 43 may make the touch panel 32 display an image to the rear of the vehicle V captured by the external cameras 19 on the left half thereof. While the action plan unit 43 is executing the driving process, the surrounding image of the vehicle V (the own vehicle) in the look-down image 47 displayed on the right half of the touch panel 32 changes along with the movement of the vehicle V. When the vehicle V reaches the target parking position, the action plan unit 43 stops the vehicle V and ends the driving process.

Figure 3C:
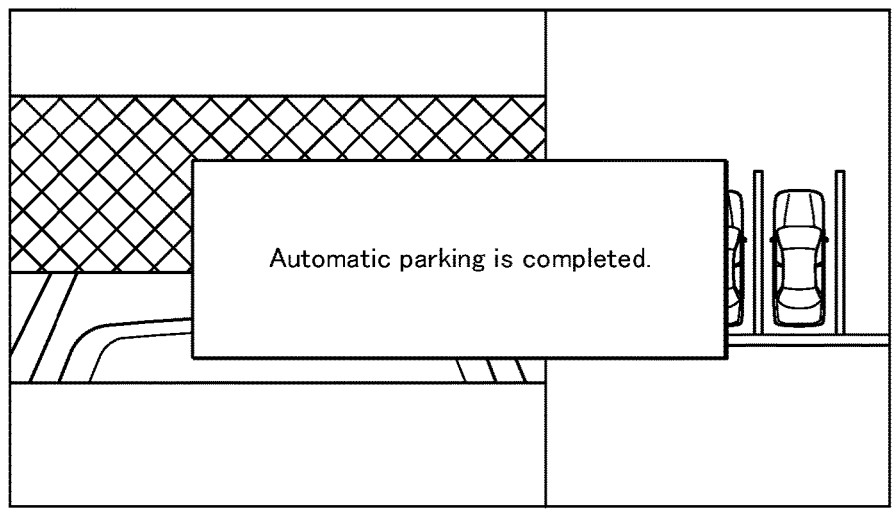
FIG. 3C is a diagram showing the screen display of the touch panel when automatic parking is completed in the parking assist system according to the embodiment.

When the driving process ends, the action plan unit 43 executes a parking process (step ST5). In the parking process, the action plan unit 43 first drives the shift actuator 17 to set the shift range (shift position) to a parking range (parking position). Thereafter, the action plan unit 43 drives the parking brake device, and makes the touch panel 32 display a pop-up window (see FIG. 3C) indicating that the automatic parking of the vehicle V has been completed. The pop-up window may be displayed on the screen of the touch panel 32 for a prescribed period. Thereafter, the action plan unit 43 may make the touch panel 32 switch the screen to an operation screen of the navigation device 10 or a map screen.

In the parking process, there may be a case where the shift range cannot be changed to the parking range because of an abnormality of the shift actuator 17 or a case where the parking brake device cannot be driven because of an abnormality of the parking brake device. In these cases, the action plan unit 43 may make the touch panel 32 display the cause of the abnormality on the screen thereof <An Outside Virtual Viewpoint Image 51, an Inside Virtual Viewpoint Image 52, and an Animation 53>

Hereinafter, an outside virtual viewpoint image 51, an inside virtual viewpoint image 52, and an animation 53 (which are examples of the surrounding image) will be described with reference to FIGS. 4 to 7. A point P in FIG. 4 indicates a center point (hereinafter referred to as "the center point P") of the vehicle V set inside the vehicle V. For example, the center point P is the center in the lateral direction and the front-and-rear direction of the vehicle V. In another embodiment, the center point P may be a point (for example, the center of gravity of the vehicle V) other than the center in the lateral direction and the front-and-rear direction of the vehicle V.

Figure 4:
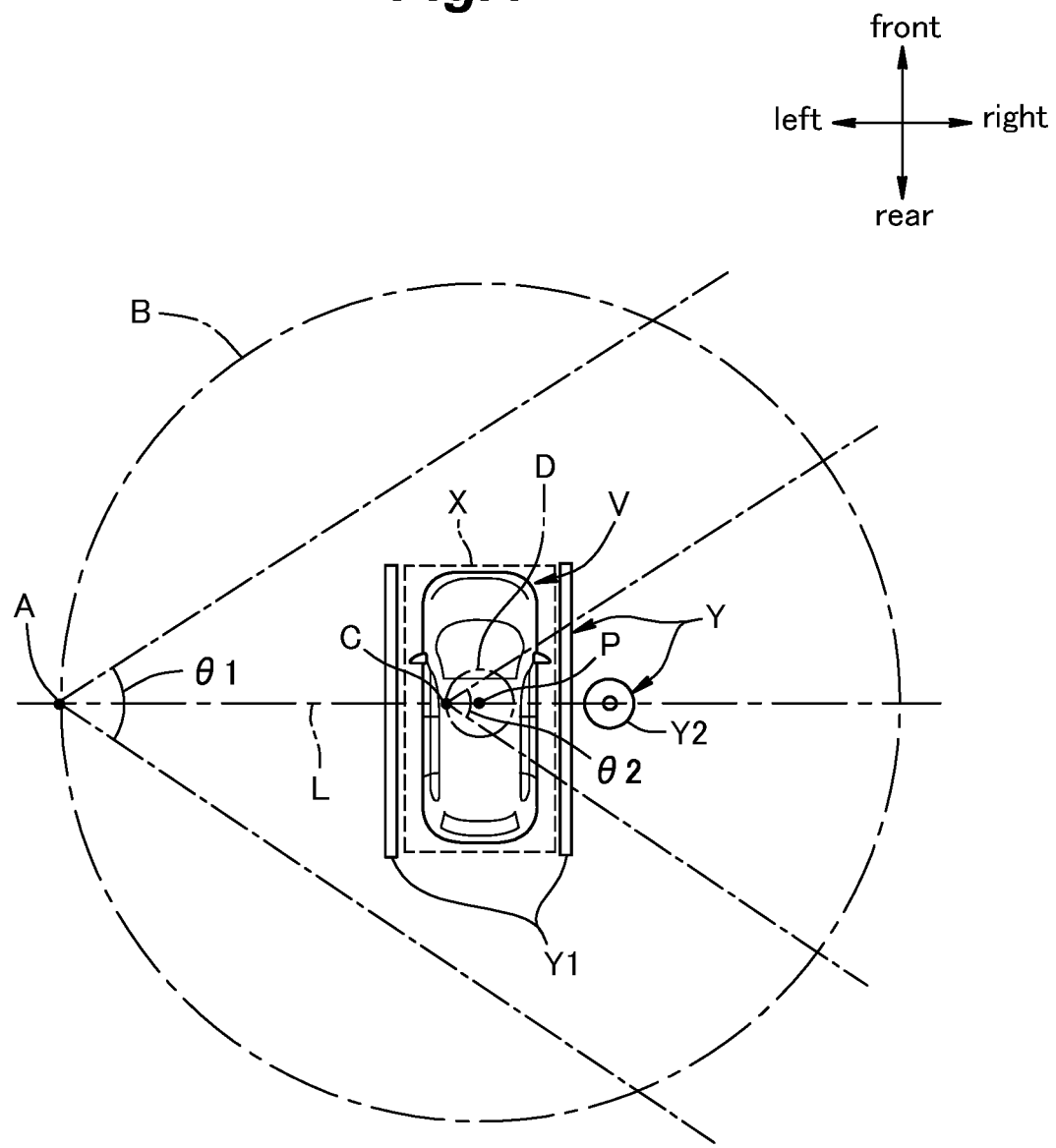
FIG. 4 is a plan view centered on the vehicle in the parking assist system according to the embodiment.

With reference to FIG. 4, the display control unit 45 sets a trajectory B (hereafter referred to as "outside trajectory B") of an outside virtual viewpoint A. The outside virtual viewpoint A is set diagonally above the vehicle V (set outside the vehicle V). In another embodiment, the outside virtual viewpoint A may be set at the same height as the vehicle V. The outside trajectory B has a perfect circular shape centered on the center point P in a plan view. In another embodiment, the outside trajectory B may have a shape (for example, an elliptical shape or a polygonal shape centered on the center point P in a plan view, an arc shape centered on the center point P in a side view, or a dome shape centered on the center point P) other than the abovementioned shape. An angle θ1 in FIG. 4 indicates an example of a view angle (hereinafter referred to as "first angle θ1") in a state where the vehicle V and objects Y around the vehicle V are looked down on (viewed) from the outside virtual viewpoint A. The objects Y include delimiting lines Y1 that delimit a parking position X (an example of a stop position) of the vehicle V, an obstacle Y2, another vehicle (not shown), and the like.

The display control unit 45 sets a trajectory D (hereinafter referred to as "inside trajectory D") of an inside virtual viewpoint C. The inside virtual viewpoint C is set in the center of the vehicle V (set inside the vehicle V). The inside trajectory D has a perfect circular shape centered on the center point P in a plan view. In another embodiment, the inside trajectory D may have a shape other than the above-mentioned shape, similarly to the outside trajectory B. Further, in still another embodiment, the display control unit 45 may fix the inside virtual viewpoint C to one point (for example, the center point P) without setting the inside trajectory D. An angle θ2 in FIG. 4 indicates an example of a view angle (hereinafter referred to as "the second angle θ2") in a state where the vehicle V and the objects Y are viewed from the inside virtual viewpoint C. The second angle θ2 may be the same as the first angle θ1 or different from the first angle θ1.

Figure 5A:
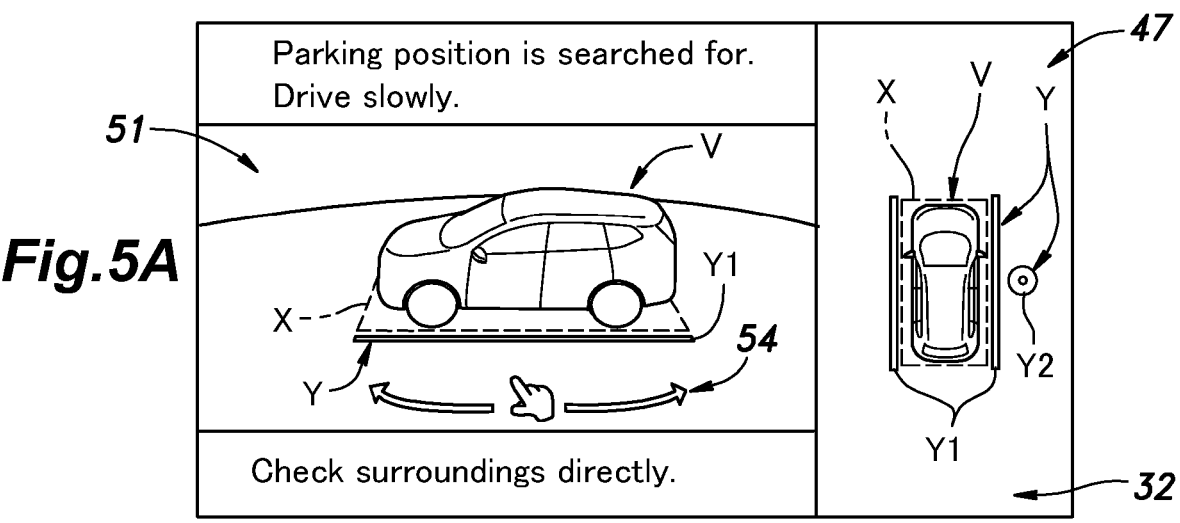
FIG. 5A is a diagram showing the screen of the touch panel on which an outside virtual viewpoint image and a look-down image are displayed in the parking assist system according to the embodiment.

With reference to FIG. 5A, the display control unit 45 generates the outside virtual viewpoint image 51 by performing image processing on the image captured by each external camera 19, and causes the touch panel 32 to display the generated outside virtual viewpoint image 51 together with the abovementioned look-down image 47. The outside virtual viewpoint image 51 is a three-dimensional image in which the vehicle V and the objects Y are looked down on (viewed) from the outside virtual viewpoint A. FIG. 5A shows the outside virtual viewpoint image 51 toward a lower right side from the outside virtual viewpoint A (see FIG. 4) on an upper left side of the center point P. In the outside virtual viewpoint image 51, the entire vehicle V and the objects Y are displayed.

Figure 5B:
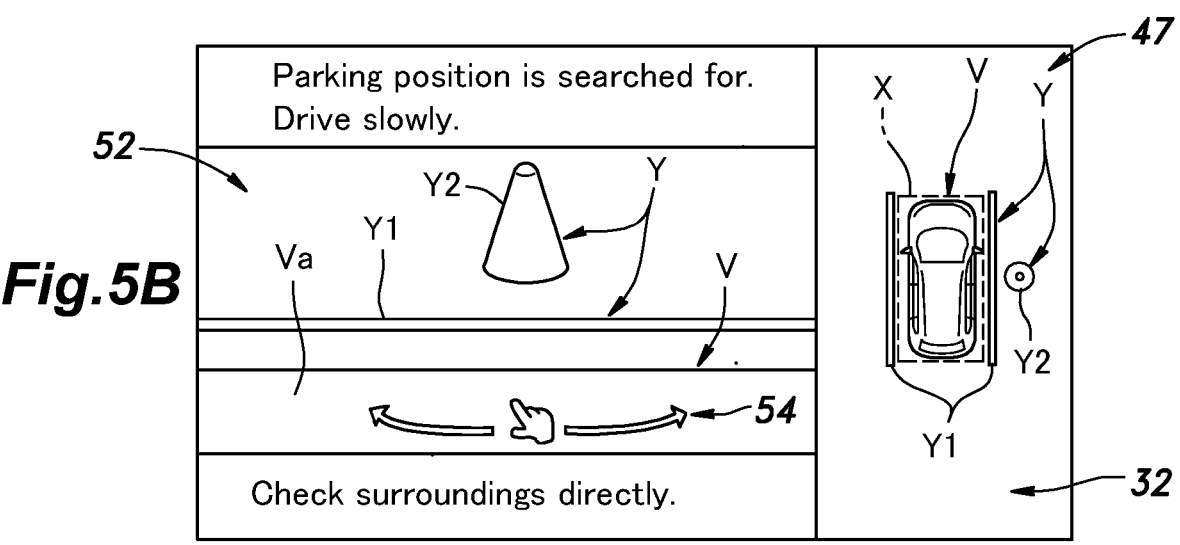
FIG. 5B is a diagram showing the screen of the touch panel on which an inside virtual viewpoint image and the look-down image are displayed in the parking assist system according to the embodiment.

With reference to FIG. 5B, the display control unit 45 generates the inside virtual viewpoint image 52 by performing image processing on the image captured by each external camera 19, and causes the touch panel 32 to display the generated inside virtual viewpoint image 52 together with the abovementioned look-down image 47. The inside virtual viewpoint image 52 is a three-dimensional image in which the vehicle V and the objects Y are viewed from the inside virtual viewpoint C. FIG. 5B shows the inside virtual viewpoint image 52 toward a right side from the inside virtual viewpoint C (see FIG. 4) on a left side of the center point P. The inside virtual viewpoint image 52 does not display the entire vehicle V, but displays the bottom Va (floor panel) of the vehicle V and the objects Y. In another embodiment, the inside virtual viewpoint image 52 may display portions of the vehicle V (for example, left and right side portions of the vehicle V and wheels) other than the bottom Va in a semi-transparent manner.

Hereinafter, the outside virtual viewpoint A and the inside virtual viewpoint C will be collectively referred to as "virtual viewpoint A, C", the outside trajectory B and the inside trajectory D will be collectively referred to as "the trajectory B, D", and the outside virtual viewpoint image 51 and the inside virtual viewpoint image 52 will be collectively referred to as "the virtual viewpoint image 51, 52".

The display control unit 45 continuously moves the virtual viewpoint A, C in the horizontal direction along the trajectory B, D according to a lateral swipe operation (an example of the input operation) on the touch panel 32 by the occupant. As the virtual viewpoint A, C moves continuously in this way, the angle of the vehicle V and the positions of the objects Y in the virtual viewpoint image 51, 52 change continuously. In another embodiment, the display control unit 45 may continuously move the virtual viewpoint A, C in the up-and-down direction according to an up-and-down swipe operation on the touch panel 32 by the occupant. Further, in still another embodiment, the display control unit 45 may move the virtual viewpoint A, C according to an operation (for example, a tap operation) other than the swipe operation by the occupant, or move the virtual viewpoint A, C according to an operation on a component (for example, a button provided around the touch panel 32) other than the touch panel 32 by the occupant.

With reference to FIGS. 5A and 5B, the display control unit 45 causes the touch panel 32 to display an operation promotion image 54 such that the operation promotion image 54 is superimposed on a lower portion of the virtual viewpoint image 51, 52. The operation promotion image 54 is an image to promote the swipe operation on the touch panel 32 by the occupant. The operation promotion image 54 includes a hand image and a pair of arrow images arranged on the left and right sides of the hand image. In another embodiment, the operation promotion image 54 may include an image other than the hand image and the arrow images.

When the touch panel 32 receives a prescribed enlarging operation (zoom-in operation: an example of the input operation) in a state where the touch panel 32 displays the outside virtual viewpoint image 51, the display control unit 45 switches the image on the touch panel 32 from the outside virtual viewpoint image 51 to the inside virtual viewpoint image 52 (that is, the display control unit 45 switches the position of the virtual viewpoint A, C from the outside of the vehicle V to the inside thereof). Accordingly, the user can switch the image on the touch panel 32 from the outside virtual viewpoint image 51 to the inside virtual viewpoint image 52 by an easy operation (namely, the enlarging operation). Accordingly, it is possible to improve the convenience of the parking assist system 1.

The enlarging operation is an operation for enlarging (zooming in on) the image displayed on the touch panel 32. For example, the enlarging operation is a pinch-out operation on the touch panel 32 (an operation to move two fingers in contact with the screen of the touch panel 32 in the directions away from each other). In another embodiment, the enlarging operation may be an operation (for example, a tap operation) other than the pinch-out operation, or may be an operation on a component (for example, a button provided around the touch panel 32) other than the touch panel 32.

When the touch panel 32 receives a prescribed reducing operation (zoom-out operation: an example of the input operation) in a state where the touch panel 32 displays the inside virtual viewpoint image 52, the display control unit 45 switches the image on the touch panel 32 from the inside virtual viewpoint image 52 to the outside virtual viewpoint image 51 (that is, the display control unit 45 switches the position of the virtual viewpoint A, C from the inside of the vehicle V to the outside thereof). Accordingly, the user can switch the image on the touch panel 32 from the inside virtual viewpoint image 52 to the outside virtual viewpoint image 51 by an easy operation (namely, the reducing operation). Accordingly, it is possible to improve the convenience of the parking assist system 1.

The reducing operation is an operation for reducing (zooming out from) the image displayed on the touch panel 32. For example, the reducing operation is a pinch-in operation on the touch panel 32 (an operation to move two fingers in contact with the screen of the touch panel 32 in the directions close to each other). That is, the direction of the reducing operation is the opposite of that of the enlarging operation. In another embodiment, the reducing operation may be an operation (for example, a tap operation) other than the pinch-in operation, or may be an operation on a component (for example, a button provided around the touch panel 32) other than the touch panel 32.

The virtual viewpoint image 51 and 52 can be enlarged/reduced according to the enlarging/reducing operation. Alternatively, the virtual viewpoint image 51 and 52 may not be enlarged/reduced. In a case where the virtual viewpoint image 51, 52 can be enlarged/reduced, the display control unit 45 may switch the image on the touch panel 32 from the outside virtual viewpoint image 51 to the inside virtual viewpoint image 52 when the touch panel 32 receives the enlarging operation in a state where the outside virtual viewpoint image 51 is maximally enlarged. In a case where the virtual viewpoint image 51, 52 can be enlarged/reduced, the display control unit 45 may switch the image on the touch panel 32 from the inside virtual viewpoint image 52 to the outside virtual viewpoint image 51 when the touch panel 32 receives the reducing operation in a state where the inside virtual viewpoint image 52 is minimally reduced. In a case where the virtual viewpoint image 51, 52 can be enlarged/reduced, the display control unit 45 may cause the touch panel 32 to display images (for example, a slide bar and a slider that moves along the slide bar) for receiving the enlarging/reducing operation, and enlarge/reduce and switch the virtual viewpoint image 51, 52 according to the enlarging/reducing operation on these images.

Figure 6A:
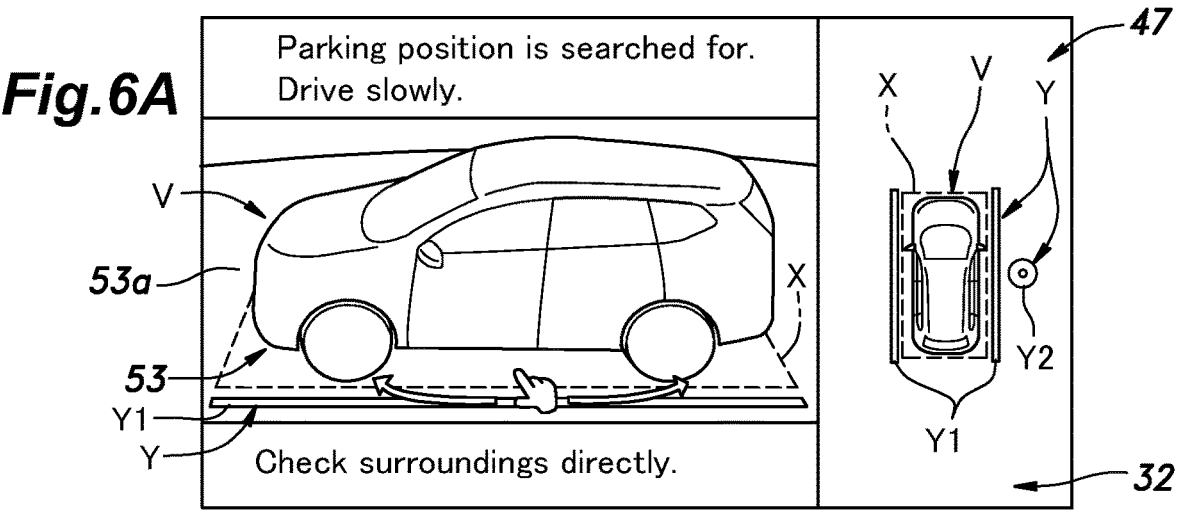
FIG. 6A is a diagram showing the screen of the touch panel on which an animation is displayed in the parking assist system according to the embodiment.
Figure 6B:
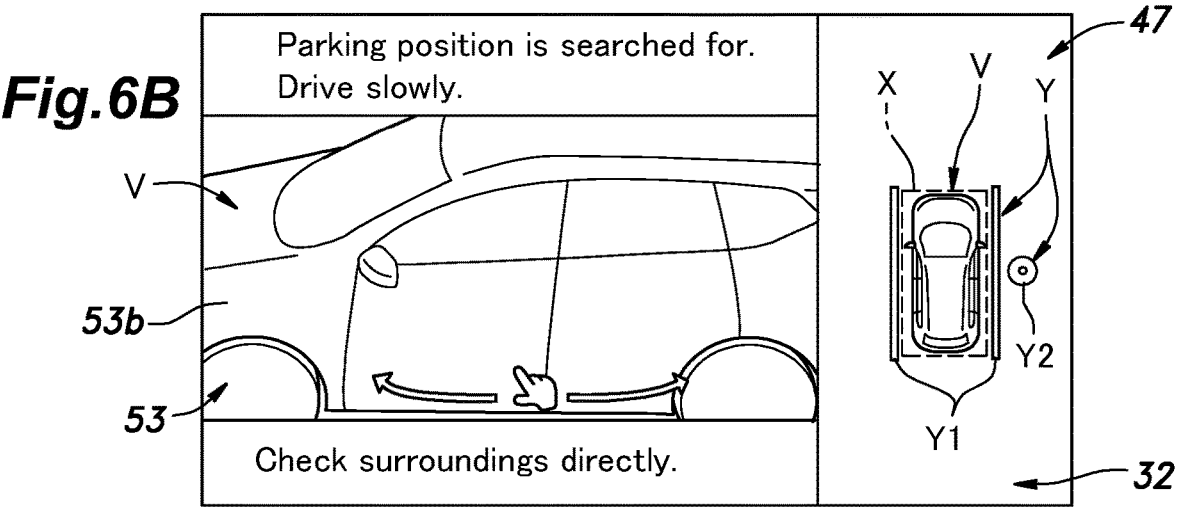
FIG. 6B is a diagram showing the screen of the touch panel on which an animation is displayed in the parking assist system according to the embodiment.
Figure 6C:
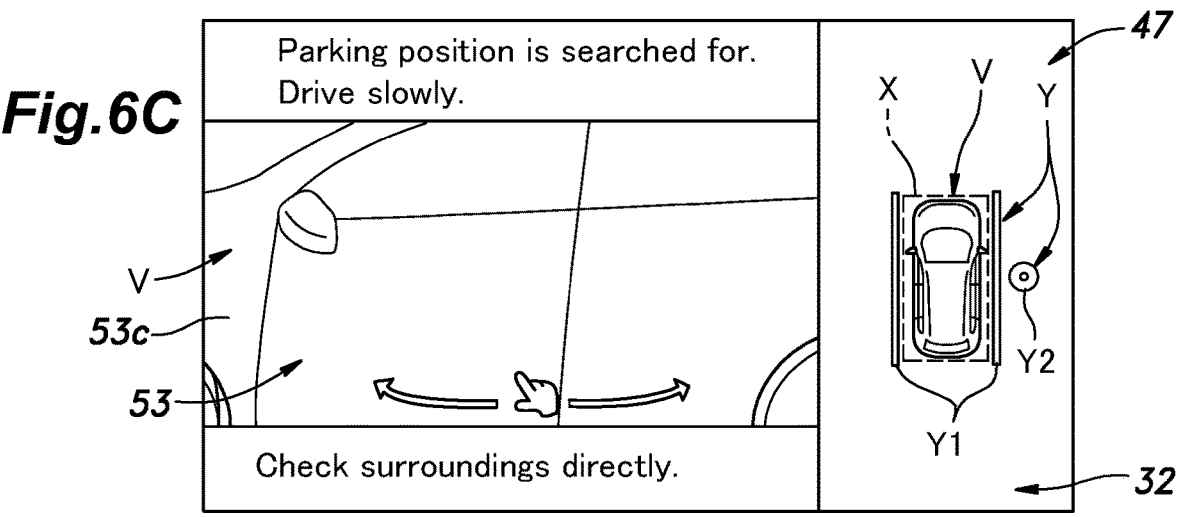
FIG. 6C is a diagram showing the screen of the touch panel on which an animation is displayed in the parking assist system according to the embodiment.

With reference to FIGS. 6 and 7, when switching the image on the touch panel 32 between the outside virtual viewpoint image 51 and the inside virtual viewpoint image 52 (that is, when switching the position of the virtual viewpoint A, C between the outside of the vehicle V and the inside thereof), the display control unit 45 causes the touch panel 32 to display the animation 53. Similar to the outside virtual viewpoint image 51, the animation 53 may display the entire vehicle V and the objects Y (see FIGS. 6A to 6C). Alternatively, similar to the inside virtual viewpoint image 52, the animation 53 may display the bottom Va of the vehicle V and the objects Y (see FIGS. 7A to 7C). In another embodiment, the objects Y may not be displayed in the animation 53, and the entire vehicle V or only the bottom Va may be displayed.

Upon switching the image on the touch panel 32 between the outside virtual viewpoint image 51 and the inside virtual viewpoint image 52, the display control unit 45 causes the touch panel 32 (more specifically, the left half of the touch panel 32) to display only the animation 53 between the outside virtual viewpoint image 51 and the inside virtual viewpoint image 52. Accordingly, it is possible to seamlessly switch the image on the touch panel 32 between the outside virtual viewpoint image 51 and the inside virtual viewpoint image 52. In another embodiment, the display control unit 45 may cause the touch panel 32 to display an image (for example, a monochromatic image like a black image) other than the animation 53 between the outside virtual viewpoint image 51 and the inside virtual viewpoint image 52.

For example, the animation 53 consists of three images (a first image 53a, a second image 53b, and a third image 53c). In another embodiment, the animation 53 may be composed of two images or four or more images. The sizes of the vehicle V and the objects Y in the animation 53 get larger in the order of the first image 53a, the second image 53b, and the third image 53c.

Upon switching the image on the touch panel 32 from the outside virtual viewpoint image 51 to the inside virtual viewpoint image 52 (that is, upon switching the position of the virtual viewpoint A, C from the outside of the vehicle V to the inside thereof), the display control unit 45 causes the touch panel 32 to display the animation 53 in the order of the first image 53a, the second image 53b, and the third image 53c. That is, upon switching the image on the touch panel 32 from the outside virtual viewpoint image 51 to the inside virtual viewpoint image 52, the display control unit 45 causes the touch panel 32 to display the animation 53 in which the vehicle V and the objects Y are gradually enlarged. Accordingly, it is possible to clearly inform the user that the image on the touch panel 32 switches from the outside virtual viewpoint image 51 to the inside virtual viewpoint image 52.

Upon switching the image on the touch panel 32 from the inside virtual viewpoint image 52 to the outside virtual viewpoint image 51 (that is, upon switching the position of the virtual viewpoint A, C from the inside of the vehicle V to the outside thereof), the display control unit 45 causes the touch panel 32 to display the animation 53 in the order of the third image 53c, the second image 53b, and the first image 53a. That is, upon switching the image on the touch panel 32 from the inside virtual viewpoint image 52 to the outside virtual viewpoint image 51, the display control unit 45 causes the touch panel 32 to display the animation 53 in which the vehicle V and the objects Y are gradually reduced. Accordingly, it is possible to clearly inform the user that the image on the touch panel 32 switches from the inside virtual viewpoint image 52 to the outside virtual viewpoint image 51.

The display control unit 45 switches the image on the touch panel 32 between the outside virtual viewpoint image 51 and the inside virtual viewpoint image 52 (that is, the display control unit 45 switches the position of the virtual viewpoint A, C between the outside of the vehicle V and the inside thereof) based on the center point P of the vehicle V. With reference to FIG. 4, for example, the display control unit 45 switches the image on the touch panel 32 between the outside virtual viewpoint image 51 and the inside virtual viewpoint image 52 such that the outside virtual viewpoint A, the inside virtual viewpoint C, and the center point P are arranged on the same straight line L in a plan view. Accordingly, the user can easily understand the position of the virtual viewpoint A, C after the switch between the outside virtual viewpoint image 51 and the inside virtual viewpoint image 52.

The display control unit 45 switches the image on the touch panel 32 between the outside virtual viewpoint image 51 and the inside virtual viewpoint image 52 (that is, the display control unit 45 switches the position of the virtual viewpoint A, C between the outside of the vehicle V and the inside thereof) such that a first direction (a direction in which the vehicle V and the objects Y are viewed from the outside virtual viewpoint A) matches a second direction (a direction in which the vehicle V and the objects Y are viewed from the inside virtual viewpoint C) in a plan view. With reference to FIG. 4, for example, the display control unit 45 switches the image on the touch panel 32 from the outside virtual viewpoint image 51 in which the vehicle V and the objects Y are looked down on (viewed) toward a lower right side from the outside virtual viewpoint A to the inside virtual viewpoint image 52 in which the vehicle V and the objects Y are viewed toward a right side from the inside virtual viewpoint C. Accordingly, the user can easily understand the direction of the virtual viewpoint A, C after the switch between the outside virtual viewpoint image 51 and the inside virtual viewpoint image 52. Further, when the image on the touch panel 32 switches from the outside virtual viewpoint image 51 to the inside virtual viewpoint image 52, a space hidden behind the vehicle V in the outside virtual viewpoint image 51 can be displayed in the inside virtual viewpoint image 52 (see FIGS. 5A and 5B). Accordingly, the user can easily check the objects Y in the above space, and thus improve the visibility of the surroundings of the vehicle V.

Other Modified Embodiments

In the above embodiment, the touch panel 32 serves as an example of the display device and the input device. On the other hand, in another embodiment, a communication device (for example, a smartphone, a tablet PC, a mobile phone, a PDA, or the like) configured to communicate with the vehicle V may serve as an example of the display device and the input device. That is, the display device and the input device are not necessarily mounted on the vehicle V. Further, in the above embodiment, the touch panel 32 serves as both the display device and the input device. On the other hand, in another embodiment, the display device and the input device may be composed of different components.

In the above embodiment, the occupant serves as an example of the user. On the other hand, in another embodiment, a person other than the occupant (that is, a person outside the vehicle V) may serve as an example of the user.

In the above embodiment, an image captured by each external camera 19 serves as an example of the external environment information acquired by the external environment information acquiring device. On the other hand, in another embodiment, information other than the image captured by each external camera 19 (for example, an image captured by an onboard camera or point group data acquired by the lidar) may serve as an example of the external environment information acquired by the external environment information acquiring device.

In the above embodiment, the vehicle V (more specifically, an automobile) serves as an example of the mobile body. On the other hand, in another embodiment, the vehicle V other than the automobile (for example, a two-wheeled vehicle) may serve as an example of the mobile body, or a mobile body (for example, a Segway, a ship, or an aircraft) other than the vehicle V may serve as an example of the mobile body.

In the above embodiment, the parking assist system 1 serves as an example of the image display system. On the other hand, in another embodiment, a system other than the parking assist system 1 (for example, a system for causing the mobile body to travel) may serve as an example of the image display system.

Concrete embodiments of the present invention have been described in the foregoing, but the present invention should not be limited by the foregoing embodiments and various modifications and alterations are possible within the scope of the present invention.

The invention claimed is:
1. An image display system, comprising:
an external environment information acquiring device configured to acquire external environment information around a mobile body;

a display device configured to display the external environment information acquired by the external environment information acquiring device;
an input device configured to receive an input operation by a user; and
a control device configured to control a display of the external environment information on the display device according to the input operation by the user,
wherein the control device is configured to generate an outside virtual viewpoint image and an inside virtual viewpoint image and cause the display device to display the outside virtual viewpoint image and the inside virtual viewpoint image, the outside virtual viewpoint image being an image in which the mobile body and an object around the mobile body are viewed from a virtual viewpoint outside the mobile body, the inside virtual viewpoint image being an image in which the mobile body and the object are viewed from a virtual viewpoint inside the mobile body, and
when the input device receives a prescribed enlarging operation in a state where the display device displays the outside virtual viewpoint image, the control device switches an image on the display device from the outside virtual viewpoint image to the inside virtual viewpoint image.

2. The image display system according to claim 1, wherein when switching the image on the display device from the outside virtual viewpoint image to the inside virtual viewpoint image, the control device causes the display device to display an animation in which the mobile body is gradually enlarged.

3. The image display system according to claim 1, wherein the control device is configured to switch the image on the display device between the outside virtual viewpoint image and the inside virtual viewpoint image based on a center point set inside the mobile body.

4. The image display system according to claim 1, wherein the control device is configured to switch the image on the display device between the outside virtual viewpoint image and the inside virtual viewpoint image such that a first direction matches a second direction in a plan view, the first direction being a direction in which the mobile body and the object are viewed from the virtual viewpoint outside the mobile body, the second direction being a direction in which the mobile body and the object are viewed from the virtual viewpoint inside the mobile body.

5. An image display system, comprising:
an external environment information acquiring device configured to acquire external environment information around a mobile body;
a display device configured to display the external environment information acquired by the external environment information acquiring device;
an input device configured to receive an input operation by a user; and
a control device configured to control a display of the external environment information on the display device according to the input operation by the user,
wherein the control device is configured to generate an outside virtual viewpoint image and an inside virtual viewpoint image and cause the display device to display the outside virtual viewpoint image and the inside virtual viewpoint image, the outside virtual viewpoint image being an image in which the mobile body and an object around the mobile body are viewed from a virtual viewpoint outside the mobile body, the inside virtual viewpoint image being an image in which the mobile body and the object are viewed from a virtual viewpoint inside the mobile body, and
when the input device receives a prescribed reducing operation in a state where the display device displays the inside virtual viewpoint image, the control device switches an image on the display device from the inside virtual viewpoint image to the outside virtual viewpoint image.

6. The image display system according to claim 5, wherein when switching the image on the display device from the inside virtual viewpoint image to the outside virtual viewpoint image, the control device causes the display device to display an animation in which the mobile body is gradually reduced.

7. The image display system according to claim 5, wherein the control device is configured to switch the image on the display device between the outside virtual viewpoint image and the inside virtual viewpoint image based on a center point set inside the mobile body.

8. The image display system according to claim 5, wherein the control device is configured to switch the image on the display device between the outside virtual viewpoint image and the inside virtual viewpoint image such that a first direction matches a second direction in a plan view, the first direction being a direction in which the mobile body and the object are viewed from the virtual viewpoint outside the mobile body, the second direction being a direction in which the mobile body and the object are viewed from the virtual viewpoint inside the mobile body.

9. An image display system, comprising:
an external environment information acquiring device configured to acquire external environment information around a mobile body;
a display device configured to display the external environment information acquired by the external environment information acquiring device;
an input device configured to receive an input operation by a user; and
a control device configured to control a display of the external environment information on the display device according to the input operation by the user,
wherein the control device is configured to generate a virtual viewpoint image and cause the display device to display the virtual viewpoint image, the virtual viewpoint image being an image in which the mobile body and an object around the mobile body are viewed from a virtual viewpoint, and
when the input device receives one of a prescribed enlarging operation and a prescribed reducing operation in a state where the display device displays the virtual viewpoint image, the control device switches a position of the virtual viewpoint between an inside of the mobile body and an outside thereof.

10. The image display system according to claim 9, wherein when switching the position of the virtual viewpoint between the inside of the mobile body and the outside thereof, the control device causes the display device to display an animation in which the mobile body is gradually enlarged or reduced.

11. The image display system according to claim 9, wherein the control device is configured to switch the position of the virtual viewpoint between the inside of the mobile body and the outside thereof based on a center point set inside the mobile body.

12. The image display system according to claim 9, wherein the control device is configured to switch the position of the virtual viewpoint between the inside of the mobile body and the outside thereof such that a first direction matches a second direction in a plan view, the first direction being a direction in which the mobile body and the object are viewed from the virtual viewpoint outside the mobile body, the second direction being a direction in which the mobile body and the object are viewed from the virtual viewpoint inside the mobile body.

* * * * *